(12) United States Patent (10) Patent No.: US 7,926,387 B2
Horiuchi et al. (45) Date of Patent: Apr. 19, 2011

(54) CHANGE-SPEED CONTROL SYSTEM FOR UTILITY VEHICLE HAVING STEPLESS CHANGE-SPEED APPARATUS FOR SPEED-CHANGING ENGINE OUTPUT AND TRANSMITTING THE SPEED-CHANGED OUTPUT TO TRAVELING UNIT

(75) Inventors: Yoshifumi Horiuchi, Sakai (JP); Yasunobu Nakatani, Sakai (JP); Hiroki Bessho, Sakai (JP); Norimi Nakamura, Sakai (JP)

(73) Assignee: Kubota Corporation, Osaka (JP)

( * ) Notice: Subject to any disclaimer, the term of this patent is extended or adjusted under 35 U.S.C. 154(b) by 303 days.

(21) Appl. No.: 12/047,024

(22) Filed: Mar. 12, 2008

(65) Prior Publication Data

US 2008/0155978 A1 Jul. 3, 2008

Related U.S. Application Data

(60) Division of application No. 11/098,589, filed on Apr. 4, 2005, now Pat. No. 7,367,247, which is a continuation of application No. 10/652,581, filed on Aug. 29, 2003, now Pat. No. 6,887,182.

(30) Foreign Application Priority Data

Feb. 24, 2003 (JP) ................................. 2003-046073

(51) Int. Cl.
*F16H 47/00* (2006.01)
*B60K 17/10* (2006.01)
(52) U.S. Cl. ........ 74/730.1; 180/312; 180/900; 180/367
(58) Field of Classification Search .................. 475/222; 74/730.1; 180/312, 348, 900
See application file for complete search history.

(56) References Cited

U.S. PATENT DOCUMENTS

| 2,562,363 | A | * | 7/1951 | Nixon | 91/473 |
| 3,833,079 | A | * | 9/1974 | Gego | 180/233 |
| 3,922,931 | A | * | 12/1975 | Osujyo et al. | 74/745 |
| 3,966,008 | A | * | 6/1976 | Klaue | 180/370 |
| 4,585,084 | A | * | 4/1986 | van der Lely | 180/53.1 |
| 4,962,679 | A | | 10/1990 | Ishikawa et al. | |
| 5,086,858 | A | | 2/1992 | Mizuta et al. | |
| 5,107,951 | A | * | 4/1992 | Kawamura | 180/248 |
| 5,207,060 | A | * | 5/1993 | Sheets | 60/483 |

(Continued)

FOREIGN PATENT DOCUMENTS

EP 0321622 A1 6/1989

(Continued)

*Primary Examiner* — Tisha D Lewis
(74) *Attorney, Agent, or Firm* — The Webb Law Firm

(57) ABSTRACT

A change-speed control system is provided for a utility vehicle having a stepless change-speed apparatus for speed-changing an engine output and transmitting the speed-changed output to a traveling unit. The system includes an engine speed governor for adjusting speed of the engine, an accelerator controller and a change-speed control linkage device for providing operative displacements in the stepless change-speed apparatus and the engine speed governor in association with an operation of the accelerator controller. The change-speed control linkage device sets an operation amount for the stepless change-speed apparatus and an operation amount for the engine speed governor in correlation with the operation amount of the accelerator controller, such that an acceleration ratio for the engine speed is greater than an acceleration ratio for the stepless change-speed apparatus until the engine reaches a predetermined speed and also the stepless change-speed apparatus reaches a predetermined speed.

31 Claims, 10 Drawing Sheets

U.S. PATENT DOCUMENTS

| | | | |
|---|---|---|---|
| 5,327,989 A | 7/1994 | Furuhashi et al. | |
| 5,405,301 A | 4/1995 | Tagi et al. | |
| 6,401,854 B2 * | 6/2002 | Yano et al. | 180/242 |
| 6,460,421 B1 * | 10/2002 | Hasegawa et al. | 73/862.29 |
| 6,517,111 B2 | 2/2003 | Mizuta | |
| 6,557,922 B1 | 5/2003 | Hommel | |
| 6,874,305 B2 * | 4/2005 | Ishimori | 56/10.8 |
| 2002/0011374 A1 | 1/2002 | Brister | |
| 2004/0195034 A1 | 10/2004 | Kato et al. | |

FOREIGN PATENT DOCUMENTS

| | | |
|---|---|---|
| GB | 1473204 | 11/1977 |
| JP | 47-46535 | 11/1972 |
| JP | 49-48693 | 12/1974 |
| JP | 60145431 A | 7/1985 |
| JP | 61-211570 | 9/1986 |
| JP | 62197618 A | 9/1987 |
| JP | 01-175533 | 7/1989 |
| JP | 02-34440 | 2/1990 |
| JP | 5-16454 | 2/1993 |
| JP | 5-260827 | 10/1993 |
| JP | 07280054 A | 10/1995 |
| JP | 2001199250 A | 7/2001 |
| JP | 2003182407 A | 7/2003 |

* cited by examiner

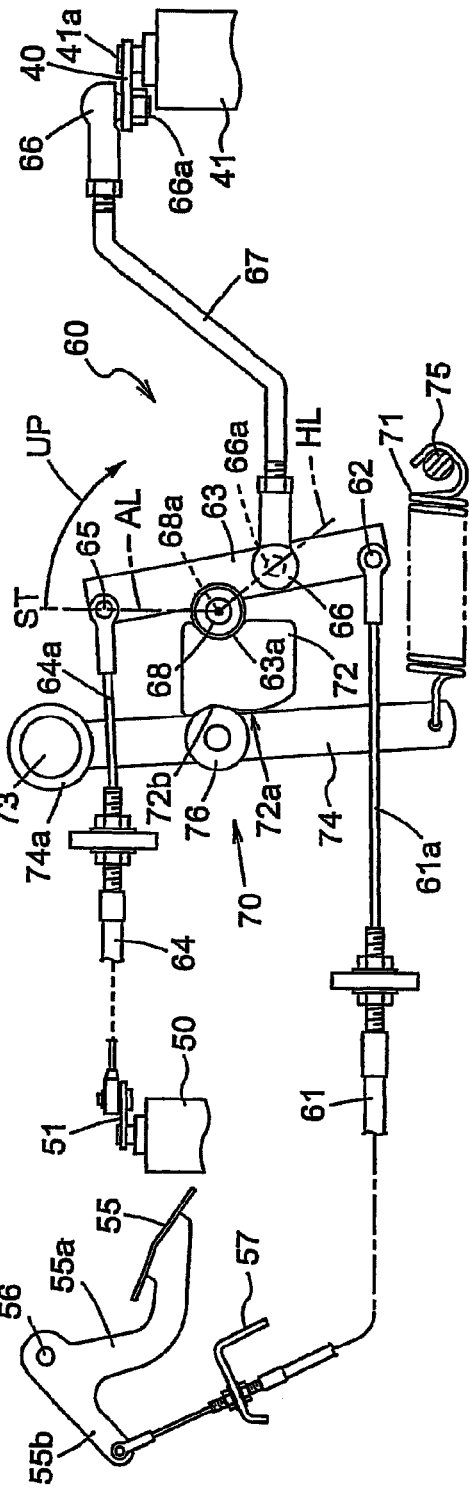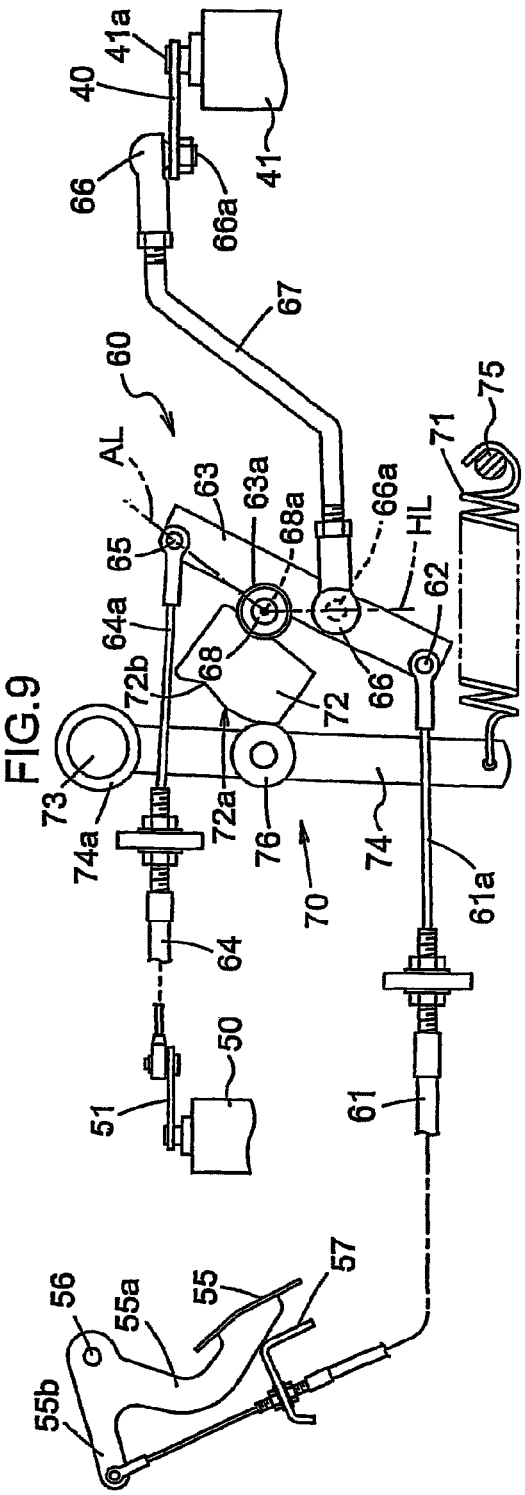

CHANGE-SPEED CONTROL SYSTEM FOR UTILITY VEHICLE HAVING STEPLESS CHANGE-SPEED APPARATUS FOR SPEED-CHANGING ENGINE OUTPUT AND TRANSMITTING THE SPEED-CHANGED OUTPUT TO TRAVELING UNIT

CROSS-REFERENCE TO RELATED APPLICATIONS

This application is a divisional of U.S. application Ser. No. 11/098,589, filed Apr. 4, 2005, which is a continuation of U.S. application Ser. No. 10/652,581, filed Aug. 29, 2003, which are incorporated herein by reference in their entirety.

BACKGROUND OF THE INVENTION

1. Field of the Invention

The present invention relates to a change-speed control system for a utility vehicle having a stepless change-speed apparatus for speed-changing an engine output and transmitting the speed-changed output to a traveling unit and also a change-speed control linkage device for linking a displacement of an accelerator controller with operations of an engine speed governor and the stepless change-speed apparatus, so that the stepless change-speed apparatus may be operated to an acceleration side in association with an operation of the engine speed governor to the acceleration side.

2. Description of the Related Art

With such change-speed control system as described above, with an operation of the accelerator operation, both an adjustment of the engine speed and an adjustment of speed of the stepless change-speed apparatus can be made. A change-speed control system of this type is known from e.g. the Japanese Patent Application "Kokai" No.: Hei. 5-260827. With this known system, if a selector switch SW is set to a road traveling position, a vehicle speed controlling means C of a controller 15 is activated and a engine speed detecting sensor 17 detects an engine speed N. Then, an electric-powered cylinder 11 is driven and controlled in such a manner that an output of a stroke sensor 16 may agree with a characteristics calculated in advance for achieving a vehicle traveling speed in proportion with the detected engine speed N, so as to increase the engine speed. With this, the electric-powered cylinder 11 will be automatically driven so as to cause the vehicle traveling speed to vary in association with the increase in the engine speed, and the stepless change-speed apparatus 4 will be operated to the acceleration side.

However, in the case of the above construction in which the change-speed operation of the stepless change-speed apparatus is effected in operative connection or linkage with an engine speed adjusting operation, when the vehicle is started with speed increasing operation of the engine, in association with this, the stepless change-speed apparatus too will be shifted to the acceleration side. Then, if the stepless change-speed apparatus is shifted to the acceleration side by an acceleration ratio equal to or greater than the acceleration ratio of the engine speed, when the vehicle starts or travels at a low speed on an inclined or rough terrain, a relatively large driving load will be applied to the vehicle. So that, due to this driving load, the start of the vehicle can be hindered by insufficient engine power or even an engine stop may occur.

SUMMARY OF THE INVENTION

In view of the above-described state of the art, a primary object of the invention is to provide a change-speed control system capable of avoiding the above-described trouble at the start or low-speed traveling of the vehicle when the change-speed operations of the engine and the stepless change-speed apparatus are effected in operative connection with each other.

For accomplishing the above-noted object, a change-speed control system according to the present invention comprises a change-speed control linkage device for providing operative displacements in the stepless change-speed apparatus and the engine speed governor in association with an operation of the accelerator controller, wherein said change-speed control linkage device sets an operation amount for the stepless change-speed apparatus and an operation amount for the engine speed governor in correlation with the operation amount of the accelerator controller, such that an acceleration ratio for the engine speed is greater than an acceleration ratio for the stepless change-speed apparatus until the engine reaches a predetermined speed and also the stepless change-speed apparatus reaches a predetermined speed.

With this system, when the engine speed governor is shifted to the acceleration side to increase the engine speed in response to an operation of the accelerator controller, with the function of the change-speed control linkage device, the stepless change-speed apparatus will be shifted to the acceleration side in operative linkage with the acceleration in the engine speed. In the course of this, the change-speed control linkage device functions such that the engine speed may be increased by an acceleration ratio greater than that in the stepless change-speed apparatus until the engine reaches a predetermined speed and also the stepless change-speed apparatus reaches a predetermined speed. According to this function, with appropriate setting, as the predetermined engine speed or speed condition, of the engine speed or speed condition with consideration to an engine speed or speed condition used during the start or low-speed traveling of the vehicle, when the vehicle is started with acceleration of the engine speed or the vehicle travels on a rough terrain with setting the engine speed low, the engine will be accelerated by a ratio greater than the stepless change-speed apparatus. As a result, even when a relatively large driving load is applied, shortage in the engine output will hardly occur, and at the same time, the engine speed governor and the stepless change-speed apparatus may be operated in operative connection with each other so that both the engine speed and the speed condition of the stepless change-speed apparatus may be increased.

Therefore, according to this change-speed control system, like the conventional construction, when the engine speed is increased in response to an operation of the accelerator controller, the stepless change-speed apparatus too may be speed-changed to the acceleration side in accordance therewith, thus allowing vehicle travel with easy speed adjustment. And, at the same time, even when a relatively large driving load is applied, the possibility of shortage in the engine output is low, so that the vehicle may be started smoothly.

The above-described change-speed control linkage device may be an electric or mechanical or electric-mechanical type device. According to one preferred embodiment, the change-speed control linkage device comprises a pivot link mechanism for dividing an operational displacement of the accelerator controller by a predetermined ratio between an operational displacement of the stepless change-speed apparatus and an operational displacement of the engine speed governor. Further, according to one specific construction of this pivot link mechanism, the pivot link mechanism includes a pivot link member operatively connected with the accelerator controller, a governor side link member slidable by said pivot link member for operating an operational portion of the engine speed governor, and a change-speed apparatus side link member slidable by said pivot link member for operating an operational portion of the stepless change-speed apparatus. According to an important aspect of this construction, the governor side link member and the change-speed apparatus side link member are operably connected with the pivotal link member as a pivot link such that with increase in the engine speed, an operational efficiency of the governor side link member by the pivot link member may be reduced and at the same time an operational efficiency of the change-speed apparatus side link member by the pivot link member may be increased.

With the above construction, in response to an operation of the accelerator controller, the pivot link member is pivoted, so that the governor side link member is slid by this pivot link member, thereby to operate the operational portion of the engine speed governor for changing the engine speed. At the same time, the change-speed apparatus side link member is slid also by the pivot link member, thereby to operate the operational portion of the stepless change-speed apparatus for shifting the stepless change-speed apparatus to the acceleration side. In this, with increase in the engine speed, the governor side link member is operated with correspondingly reduced operational efficiency by the pivot link member, whereas the change-speed apparatus side link member is operated with correspondingly increased operational efficiency by the pivot link member. Therefore, the engine speed governor and the stepless change-speed apparatus may be operated in favorable operative connection with each other, such that in an operational range where the engine speed is low, thus tending to invite engine power shortage, the engine will be accelerated by a ratio greater than the stepless change-speed apparatus and also that even if a relatively large driving load is applied, since the stepless change-speed apparatus is at a low speed, engine power shortage will not or will hardly occur. Whereas, in an operational range where the engine speed is high, thus providing stable engine output, the stepless change-speed apparatus will be accelerated by a ratio greater than the engine. Hence, in this case, the engine speed governor and the stepless change-speed apparatus may be operated in favorable operative connection, such that the stepless change-speed apparatus may be speed-changed speedily and by a relatively large ratio, without engine power shortage.

Further and other features and advantages of the invention will become apparent upon reading the following detailed disclosure of the invention with reference to the accompanying drawings.

BRIEF DESCRIPTION OF THE DRAWINGS

FIG. 8 is a side view showing a condition of a change-speed control system when a stepping operation on an accelerator pedal is released, FIG. 9 is a side view showing a further condition of the change-speed control system when the accelerator pedal is stepped on, FIG. 10 is an explanatory view illustrating operational efficiencies of a control cable and a link rod of a pivot link member.

DESCRIPTION OF THE PREFERRED EMBODIMENTS

Figure 1:
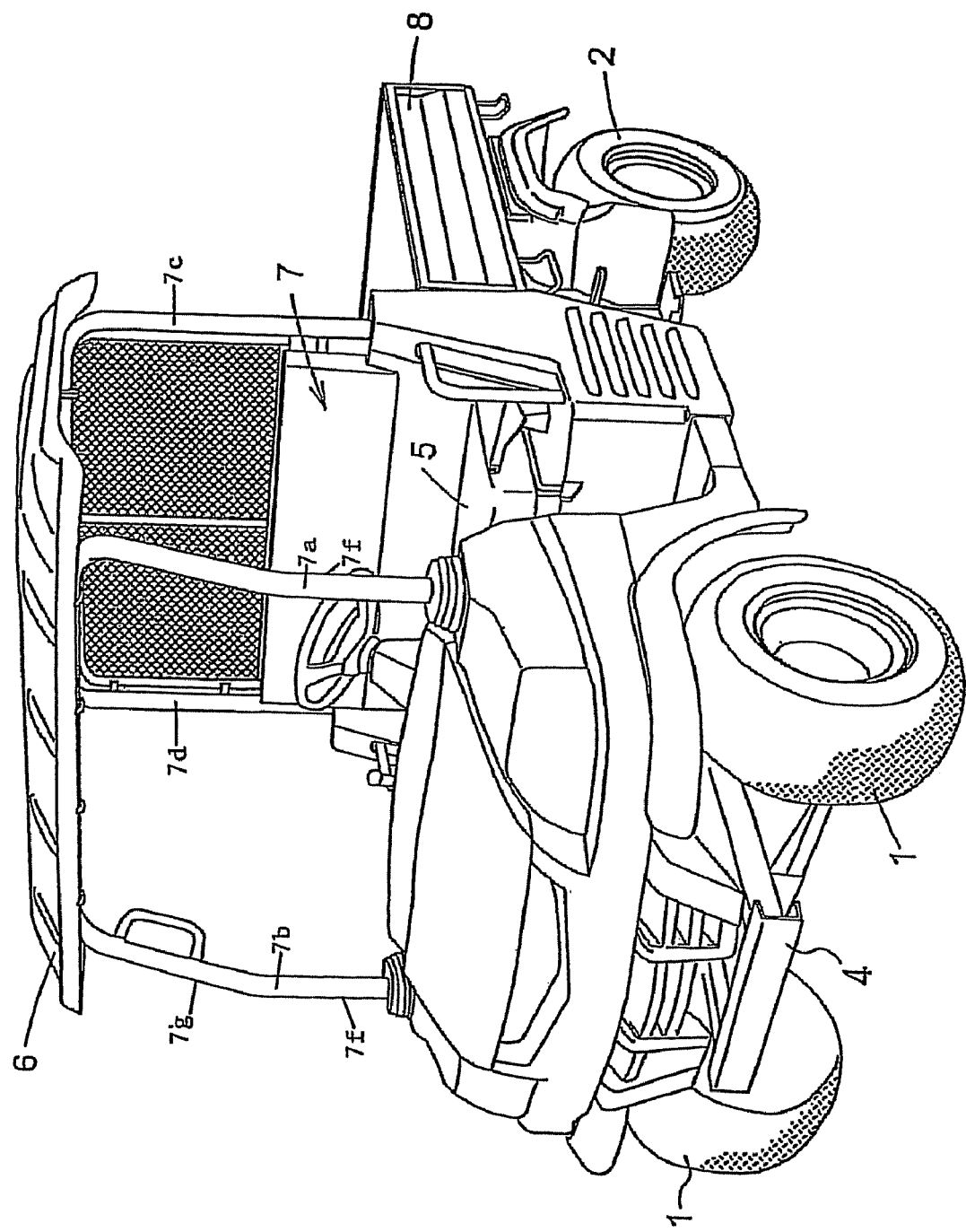
FIG. 1 is a perspective view showing entirely a utility vehicle having a change-speed control system according to the present invention.
Figure 2:
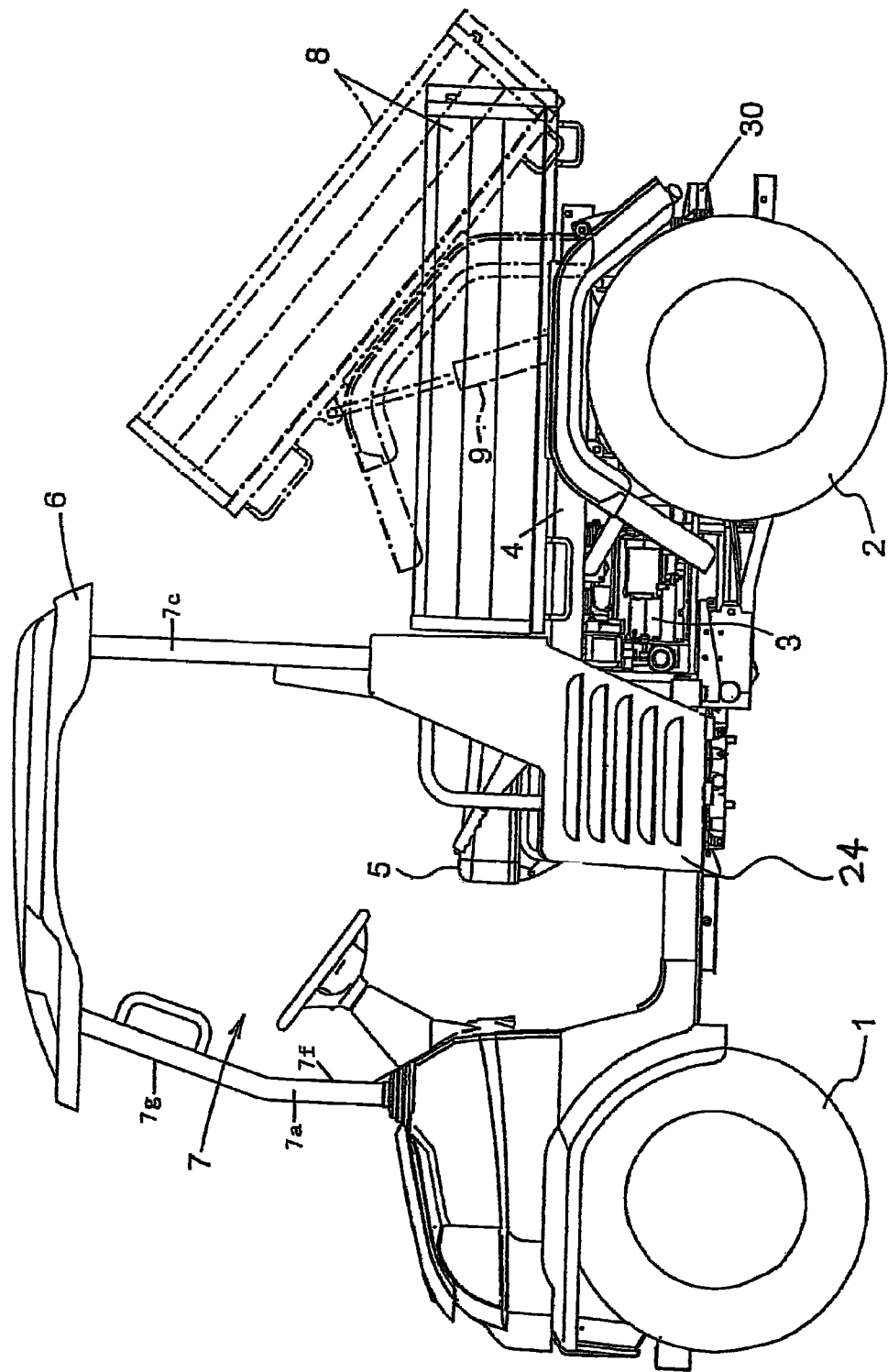
FIG. 2 is a side view showing the entire utility vehicle.
Figure 3:
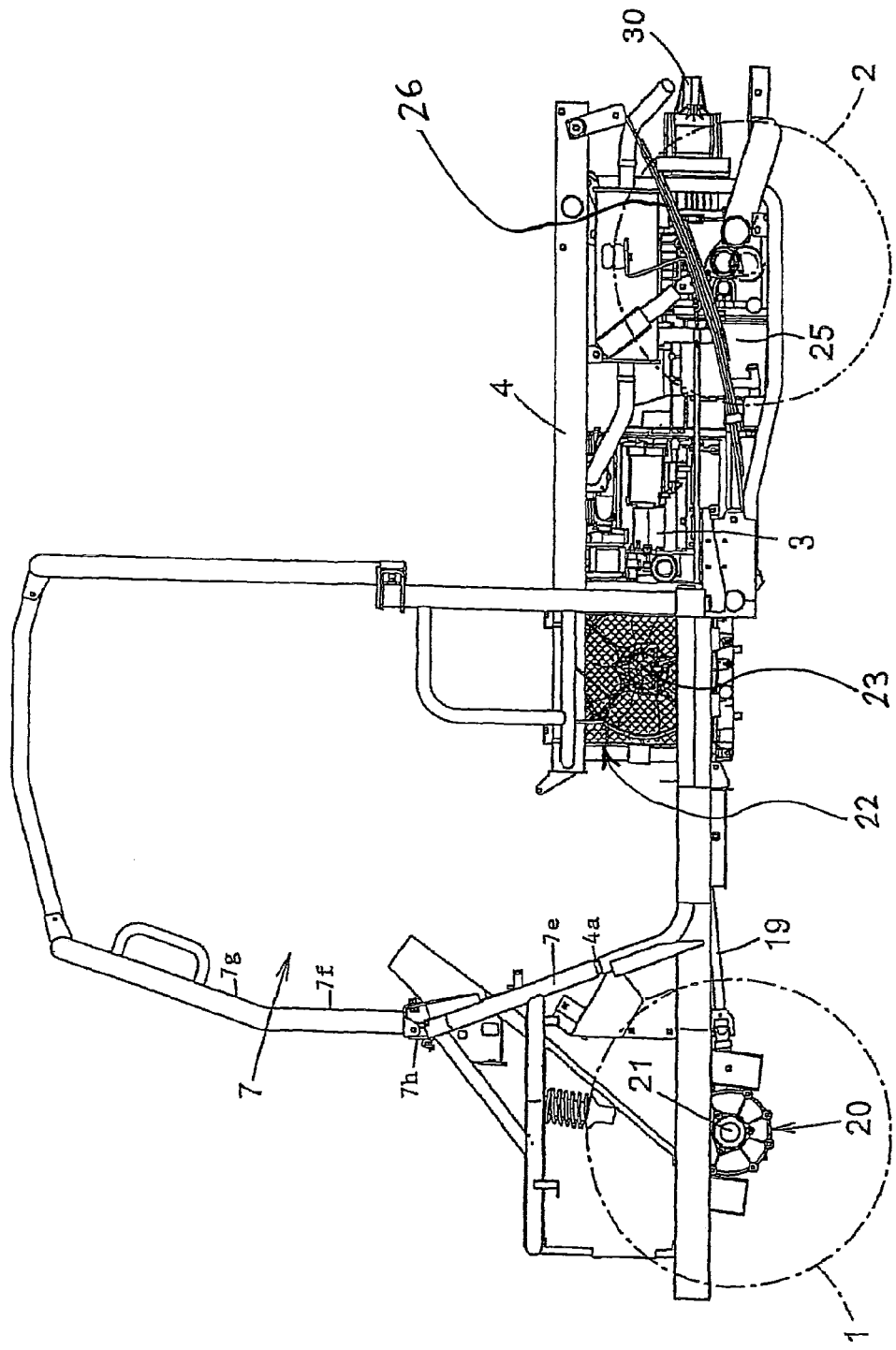
FIG. 3 is a side view of a vehicle chassis.

As shown in FIG. 1, FIG. 2 and FIG. 3, a utility vehicle includes a vehicle chassis 4 supported on the ground by a pair of left and right steerable tired front wheels 1 and a pair of left and right tired rear wheels 2. The chassis 4 mounts, at its front portion and between the front and rear wheels, an engine 3 for driving the front and rear wheels 1, 2. The chassis 4 further mounts, at its front portion, a driver's cabin 7 including a seat 5 and a sunshade 6. The chassis 4 mounts, at its rear portion, a load carrier 8, which is vertically pivotable by a dump cylinder 9 about an axis located rearwardly of the carrier 8 and extending transversely of the vehicle body. A radiator 22, as shown in FIG. 3, is located forwardly of the engine 3 for cooling the engine 3. A radiator fan shaft 23 of the radiator 22 is oriented laterally with respect to the longitudinal direction of the vehicle. A lateral side plate 24, as shown in FIG. 2, forms a ventilation area for taking in air into the radiator 22 at a location of the side plate 24 corresponding to the position of the radiator 22. Each of the pair of rear wheels 2 is resiliently supported by a leaf spring 26.

Figure 4:
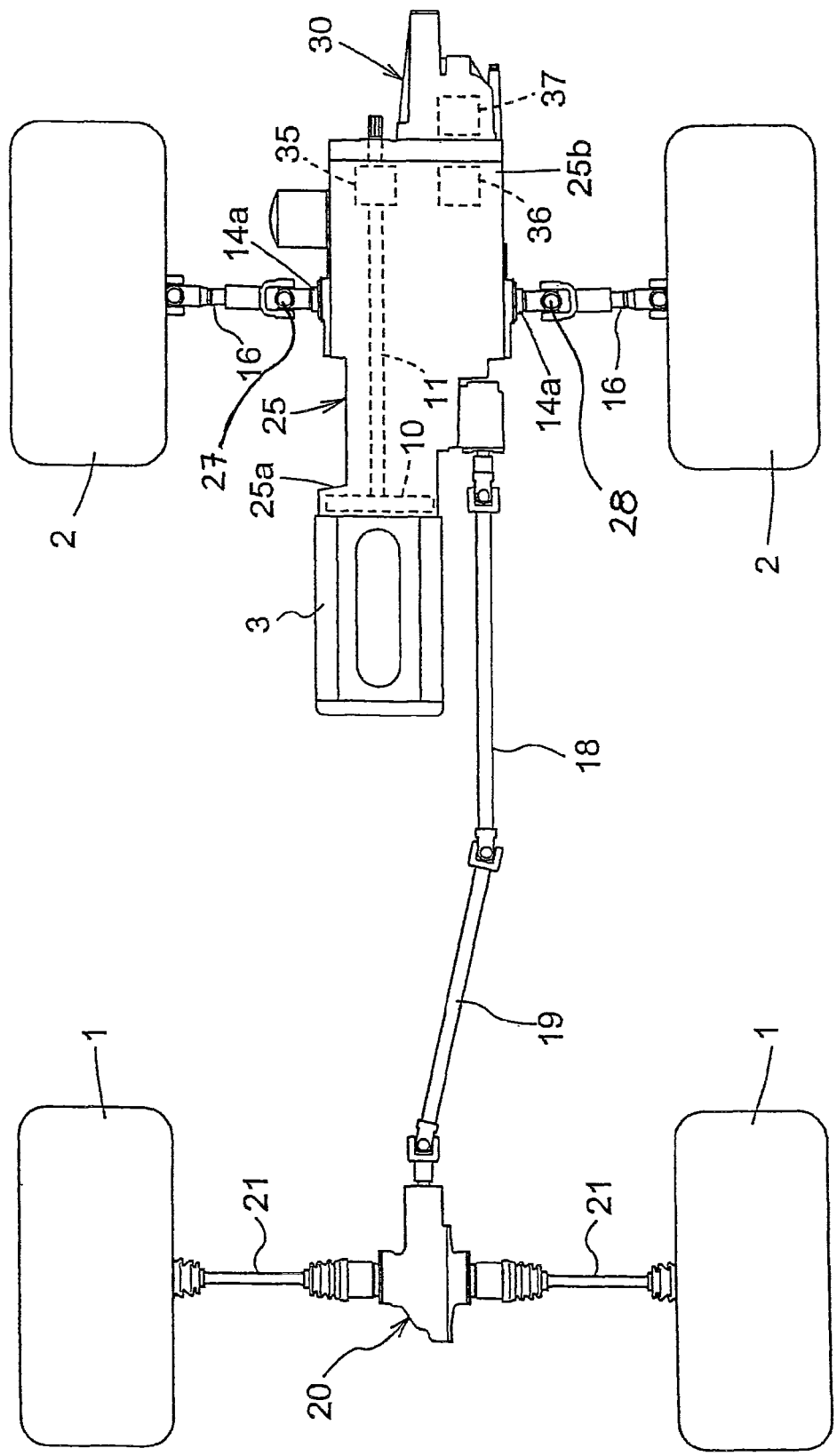
FIG. 4 is a plan view of a traveling transmission unit.
Figure 5:
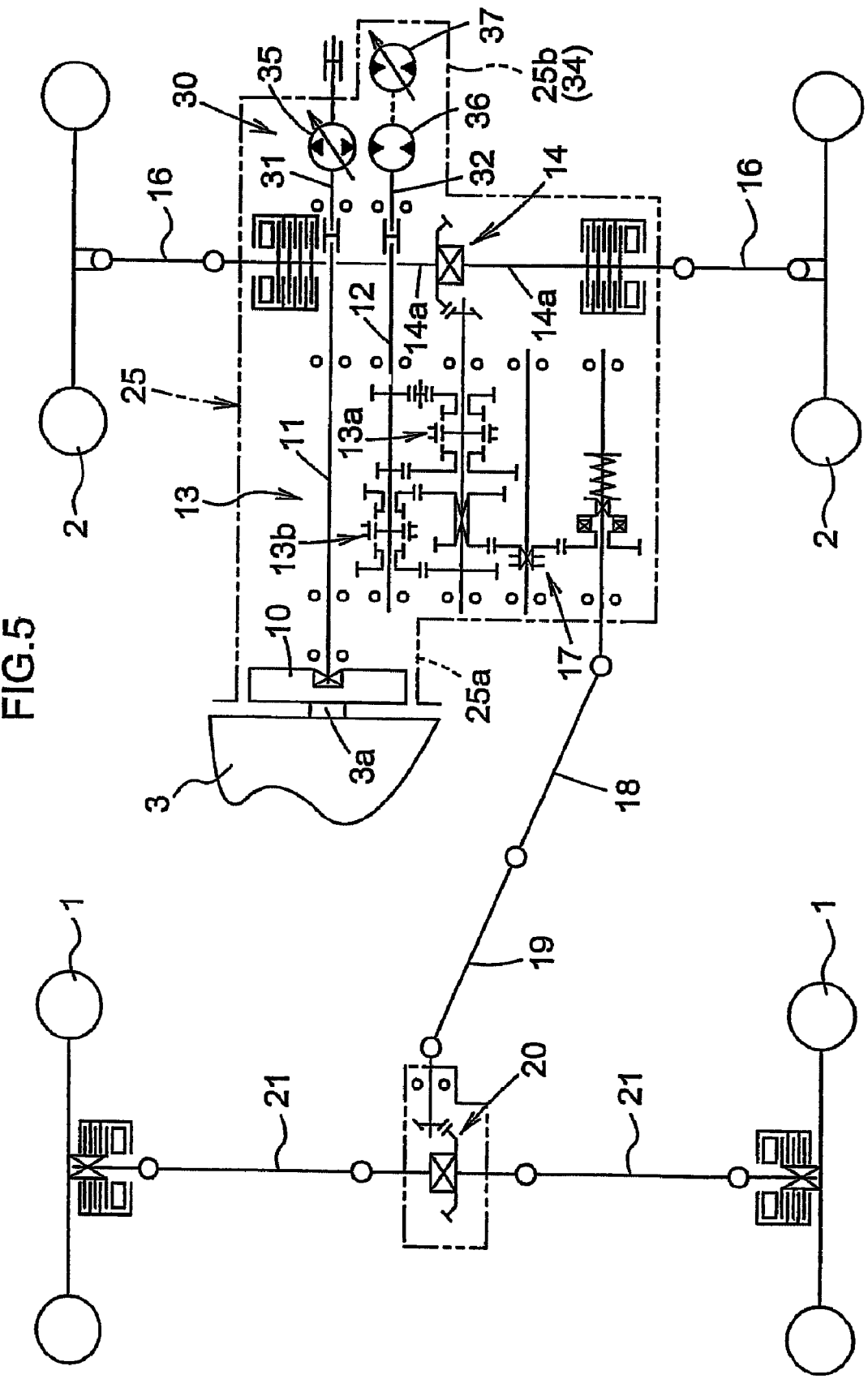
FIG. 5 is a schematic of the traveling transmission unit.

The power of the engine 3 is transmitted to the front and rear wheels 1, 2 by a traveling transmission unit shown in FIGS. 4 and 5. More particularly, an output from an output shaft 3a attached with a flywheel 10 located rearwardly of the engine 3 is transmitted via a rotational shaft 11 to an input shaft 31 of a hydrostatic type stepless change-speed apparatus 30. And, the output from an output shaft 32 of this stepless change-speed apparatus 30 is transmitted via a rotational shaft 12 to a gear transmission 13. Then, the output of this gear transmission 13 is inputted to a rear-wheel differential mechanism 14, and outputs from left and right output shafts 14a of this rear-wheel differential mechanism 14 are transmitted via a rotational shaft 16 to the rear wheels 2. A first joint 27 is located between and articulately joins one output shaft 14a and one rotational shaft 16 and a second joint 28 is located between and articulately joins the other output shaft 14a and the other rotational shaft 16. The front-wheel output from the gear transmission 13 is inputted via a clutch mechanism 17 for allowing or breaking power transmission to the front wheels 1 and rotational shafts 18, 19 to a front-wheel differential mechanism 20. And, left and right outputs from this front-wheel differential mechanism 20 are transmitted via a rotational shaft 21 to the front wheels 1.

The gear transmission 13, the rear-wheel differential mechanism 14, the clutch mechanism 17 and the rotational shafts 11, 12 are all accommodated within a transmission casing 25 connected via a flywheel casing 25a to the rear of the engine 3. The rear-wheel differential mechanism 14 is arranged at a more rear side of the vehicle body than the gear transmission 13.

With a shifting operation of a shift gear 13a, the gear transmission 13 selectively provides a forward traveling condition in which the output from the stepless change-speed apparatus 30 is switched over to the forward traveling side and a rear traveling condition in which the output from the stepless change-speed apparatus 30 is switched over to the rear traveling side. Further, with a shifting operation of a shift gear 13b, the forward driving power is speed-changed to either a high speed or a low speed and outputted as such.

As shown in FIG. 4 and FIG. 5, the stepless change-speed apparatus 30 is disposed vehicle-wise rearwardly of the gear transmission 13 of the transmission casing 25 and also vehicle-wise rearwardly of the left and right output shafts 14a of the rear-wheel differential mechanism 14.

Figure 6:
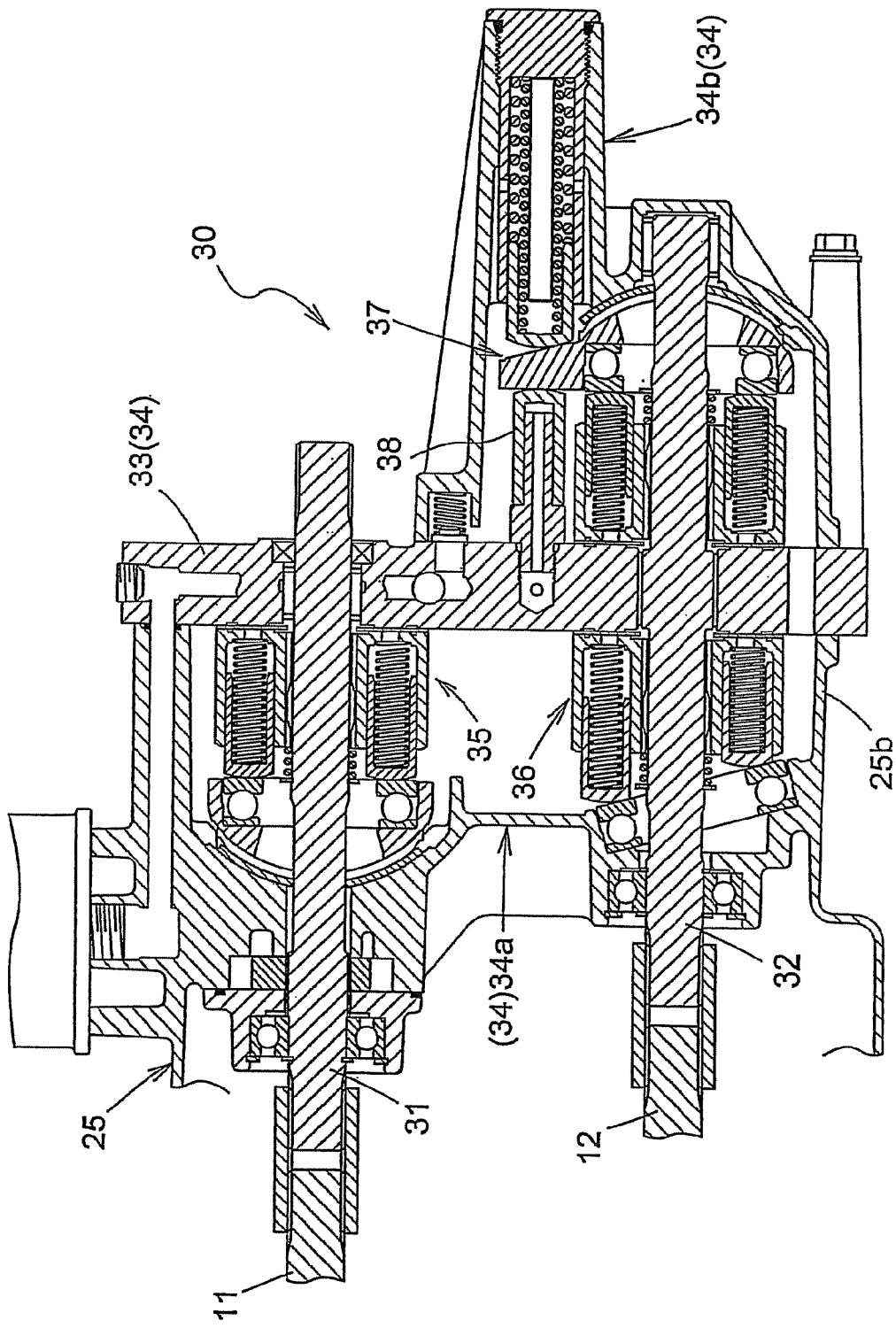
FIG. 6 is a section view of a stepless change-speed apparatus.

As shown in FIG. 6, the stepless change-speed apparatus 30 includes a housing 34 having a port block 33 connected to the rear end of the transmission casing 25, an axial-plunger type variable displacement hydraulic pump 35 and an axial-plunger type fixed displacement hydraulic motor 36 housed in the housing 34 at a portion thereof vehicle-wise rearwardly of the port block 33, and an axial-plunger type variable displacement hydraulic motor 37 housed in the housing 34 at a portion thereof vehicle-wise rearwardly of the port block 33.

The output shaft 32 of the stepless change-speed apparatus 30 acts as a common output shaft shared by the two hydraulic motors 36, 37. In response to a change in a swash-plate angle of the variable displacement hydraulic motor 37 by a motor switchover cylinder 38 provided at a rear portion of the housing 34, this hydraulic motor 37 is adjusted to a driving condition or a neutral condition. As may be apparent from FIG. 6 and FIG. 7, the port block 33 includes a drive oil passage 39 so that pressure oil from the hydraulic pump 35 is supplied to the two hydraulic motors 36, 37 for driving these motors 36, 37. The motor switchover or adjusting cylinder 38 is activated in response to a pilot pressure developed in the driving oil passage 39 when the oil pressure of this passage 39 exceeds a predetermined oil pressure, thereby to automatically switch over the hydraulic motor 37 to the driving condition. Whereas, when the oil pressure in the driving oil passage 39 is below the predetermined oil pressure, the cylinder 38 automatically switches over the hydraulic motor 37 to the neutral condition.

With the above, with this stepless change-speed apparatus 30, as the driving force transmitted via the rotational shaft 11 from the engine 3 is inputted to the input shaft 31 acting as the input shaft for the hydraulic pump 35, this hydraulic pump 35 is driven, so that the hydraulic motors 36 and 37 are driven by the pressure oil from the hydraulic pump 35 and the output shaft 32 is then driven by these hydraulic motors 35, 37. That is to say, this stepless change-speed apparatus is constructed as an HST capable of transmitting the drive force from the engine 3 with stepless speed change thereof by changing the swash-plate angle of the hydraulic pump 35. Further, when the front and rear wheel driving load in the output shaft 32 is below a predetermined load, the oil pressure in the driving oil passage 39 will be blow the predetermined oil pressure, so that the motor switchover cylinder 38 switches over the hydraulic motor 39 to the neutral condition. Accordingly, the pressure oil from the hydraulic pump 35 is supplied only to the fixed displacement type hydraulic motor 36 of the two hydraulic motors 36, 37, and only this hydraulic motor 36 is driven at a high speed. On the other had, when the front-rear driving load in the output shaft 32 exceeds the predetermined oil pressure, the oil pressure in the driving oil passage 39 will exceed the predetermined oil pressure, so that the motor switchover cylinder 38 switches over the hydraulic motor 37 to the driving condition. Hence, the pressure oil from the hydraulic pump 35 is supplied in distribution to the two hydraulic motors 36, 37, so that the these two hydraulic motors 36, 37 are driven at low speed.

As shown in FIG. 6, by simultaneous casting with the transmission casing 25, the housing 34 of the stepless change-speed apparatus 30 is formed integral with the rear of a portion 25b of this transmission casing 25 accommodating the rear-wheel differential mechanism 14 therein. Further, this housing 34 includes a first housing body 34a accommodating the hydraulic pump 35 and the fixed displacement hydraulic motor 36, the port block 33 detachably screw-connected to the first housing body 34a for closing a vehicle-wise rear opening of this housing body 34a, and a second housing body 34b bolt-connected to a vehicle-wise rear side face of the port block 33 and accommodating the variable displacement hydraulic motor 37 and the motor switchover cylinder 38.

FIG. 8 shows a construction of the change-speed control system, in which an engine speed governor 50 is provided at a side rearwardly of the engine 3 for variably adjusting engine speed through adjustment of supply amount of fuel to the engine, and the engine speed governor 50 and the stepless change-speed apparatus 30 are operated by means of a single accelerator pedal 55 provided in the driver's cabin 7.

This change-speed control system includes the accelerator pedal 55 connected via its arm portion 55a to a support shaft 56, a change-speed control linkage device 60 for linking this accelerator pedal 55 to a pivotable speed governor portion 51 of the engine speed governor 50 and to a pivotable change-speed controlling portion 40 of the stepless change-speed apparatus 30, and an automatic return mechanism 70 having a return spring 71.

With a progressive stepping-on operation of the accelerator pedal 55, depending on this stepped-on operational amount, as shown in FIG. 9, the arm portion 55a is pivoted downward about an axis of the support shaft 56 extending transversely relative to the vehicle body, and this arm portion 55a can be pivoted to a stepped-on limit position where it contacts a stopper formed by a cable holder 57. With release of the stepping-on operation, the arm portion 55a is pivoted upward about the axis of the support shaft 56 by the operational force of the return spring 71 to be automatically returned to a stepped-on released position shown in FIG. 8.

Next, the construction of the change-speed control linkage device 60 will be described. First, a link pivot member 63 as a pivot link pivotally connected to a support shaft 68 included in the transmission casing 25 via an attaching boss 63a located between a connector pin 65 to which a governor side control cable 64 is connected and a connector pin 62 to which a joint 66 connected to a link rod 67 and an apparatus side control cable 61 are connected. So that, the link pivot member 63 can be pivoted about the axis 68a of the support shaft 68, relative to the transmission casing 25.

To an output arm portion 55b extending from the base of the arm portion 55a of the accelerator pedal 55, one end of an inner cable 61a of a control cable 61 is connected. And, an end of an outer cable of the control cable 61 is supported to the cable holder 57.

The other end of the inner cable 61a of this pedal side control cable 61 is pivotally connected via the connector pin 62 to one free end of the pivot link member 63. An end of an inner cable 64a is pivotally connected via the connector pin 65 to the other free end of the pivot link member 63. The other end of the inner cable 64a is connected to the speed governor portion 51. The pivot link member 63 and the speed governor portion 51 are operatively connected via a governor side control cable 64. To a free end of the pivot link member 63 to which the pedal side control cable 61 is connected, one end of the link rod 67 is connected via a joint 66. And, the other end of this link rod 67 is connected to the change-speed controlling portion 40 by the joint 66.

Both the joint 66 connecting the link rod 67 to the pivot link member 63 and the joint 66 connecting the rod to the change-speed controlling portion 40 comprise joints screw-connected to the link rod 67. And, this joint has a spherical joint portion. Then, by utilizing this spherical joint portion, the joint is pivotally connected to the pivot link member 63 or the change-speed controlling portion 40. Incidentally, one side of this spherical joint is screw-connected to the pivot link member 63 or the change-speed controlling portion 40 via a screw shaft member 66a.

Figure 10:
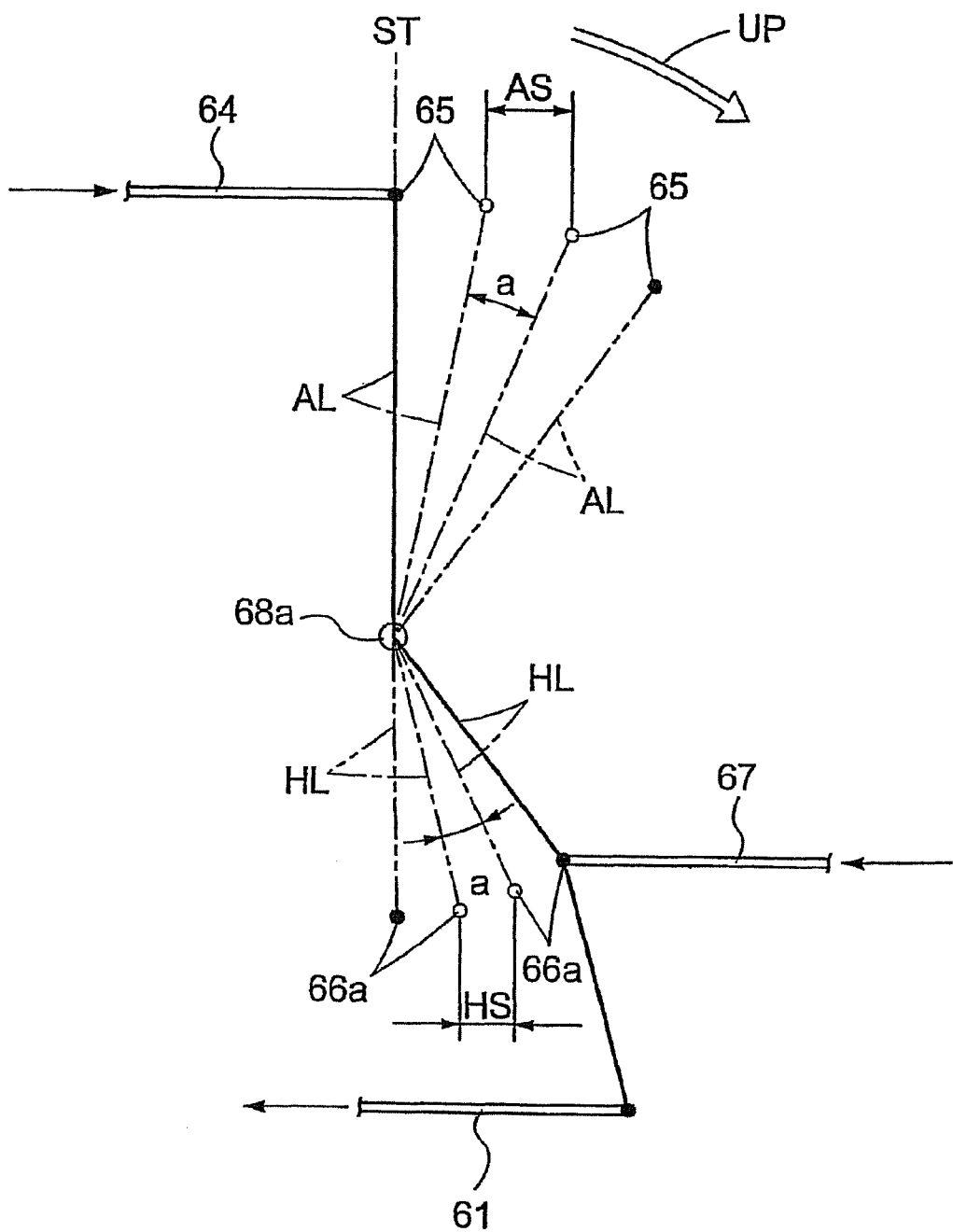

The linkage design of the pivot link member 63, the governor side control cable 64 and the link rod 6 is illustrated in FIG. 8, FIG. 9 and FIG. 10. More particularly, a governor side straight line: AL is formed as a straight line extending through the connector pin 65 as a governor connecting point connected by the control cable 64 of the pivot link member 63 and a pivot axis 68a of the pivot link member 63. A change-speed apparatus side straight line: HL is formed as a straight line extending through the screw shaft member 66a of the joint 66 as the changes-speed apparatus connecting portion connected by the link rod 67 of the pivot link member 63 and the pivot axis 68a of the pivot link member 63. And, these lines, i.e. the governor side straight line AL and the change-speed apparatus side straight line HL are set to intersect each other.

Further, the pivot link member 63 has a unit pivot angle (a). And, the inner cable 64a of the control cable 64 is pulled by a stroke amount (AS) in response to a pivotal movement of the pivot link member 63 by said unit pivot angle (a). Then, the ratio between (a) and (AS), i.e. AS/a is used as an operational efficiency of the control cable 64 by the pivot link member 63. Further, the link rod 67 is pulled by a stroke (HS) in response to the pivotal movement of the pivot link member 63 by said unit pivot angle (a). Then, the ratio between (a) and (HS), i.e. HS/a is used as an operational efficiency of the link rod 67 by the pivot link member 63. According to this linkage design, the higher the speed of the engine speed governor 50, i.e. the higher the engine speed, the lower the operational efficiency: As/a and the higher the operational efficiency: HS/a. Further, when the stepless change-speed apparatus 30 is set to the neutral condition, the operational efficiency: AS/a becomes maximum, while the other operational efficiency: HS/a becomes minimum.

As shown in FIG. 8, the automatic return mechanism 70 includes a cam follower 72 attached to the attaching boss 63a of the pivot link member 63 to be pivotable therewith, a cam arm 74 pivotally connected via an attaching boss 74a at one end thereof to the support shaft 73 included in the transmission casing 25 and pivotally supported to the transmission casing 25 to be pivotable about the axis of the support shaft 73, and the return spring 71 attached between this cam arm 74 and a spring-hook pin 75 fixed to the transmission casing 25. The return spring 71 pivotally urges the cam arm 74 toward the pivot link member 63, so that a cam 76 provided by attaching a roller to an intermediate portion of the cam arm 74 is urged against a cam follower face 72a of the cam follower 72, thereby to pivotally urge the pivot link member 63 to a stop position ST shown in FIG. 8.

With the above, according to the automatic return mechanism 70, by means of the elastic resilient force of the return spring 71, the pivot link member 63 is pivotally urged to the stop position ST via the cam 76 and the cam follower 72. With this, the mechanism 70 provides the pivotal urging function so that the change-speed controlling portion 40 may be automatically returned to the disengaged position where the stepless change-speed apparatus 30 is neutral and also the speed governor portion 51 may be automatically returned to the idling position. When the stepless change-speed apparatus 30 is set to the neutral condition, the cam 76 enters a recess 72b of the cam follower face 72a, whereby the cam 76 and the cam follower 72 are engaged with each other. With this, the change-speed controlling portion 40 is fixed at the disengaged position, thereby to prevent vibrations or an inadvertent pivotal displacement of the change-speed controlling portion 40 due to the oil pressure acting on the swash plate of the hydraulic pump 35.

According to the above-described construction, in response to an operation on the accelerator pedal 55, the change-speed control linkage device 60 operates the engine speed governor 50 and the stepless change-speed apparatus 30 in manners described next.

Namely, when the accelerator pedal 55 is stepped on, this operational force pulls the inner cable 61a of the control cable 61, thereby to pivotally operate the pivot link member 63 to the acceleration side. Then, this pivotal operation of the pivot link member 63 pulls the inner cable 64a of the control cable 64, thereby to pivotally operate the governor portion 51 of the engine speed governor 50, so that the engine speed governor 50 is operated to the acceleration side for increasing the speed of the engine 3. In the course of this, the pivot link member 63 pulls the link rod 67, thereby to pivotally operate the controlling portion 40 of the stepless change-speed apparatus 30, so that the stepless change-speed apparatus 30 is operated to the acceleration side for increasing the driving speed of the front and rear wheels 1, 2. Further, with the above-described setting of the operational efficiency AS/a of the control cable 64 by the pivot link member 63 and the operational efficiency HS/a of the link rod 67 by the pivot link member 63, the engine speed governor 50 and the stepless change-speed apparatus 30 are operated in operative correlation with each other such that the operational stroke of the accelerator pedal 55, the engine speed (the speed of the governor 50) and the speed condition of the stepless change-speed apparatus 30 may have correlation as shown in FIGS. 11 and 12.

Figure 11:
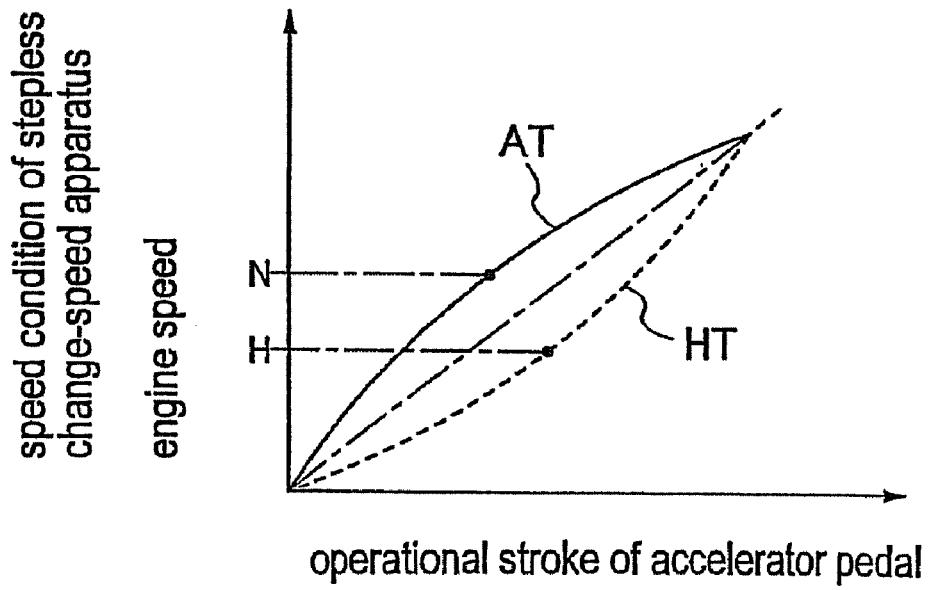
FIG. 11 is an explanatory view showing engine speed and change-speed characteristics of the stepless change-speed apparatus.
Figure 12:
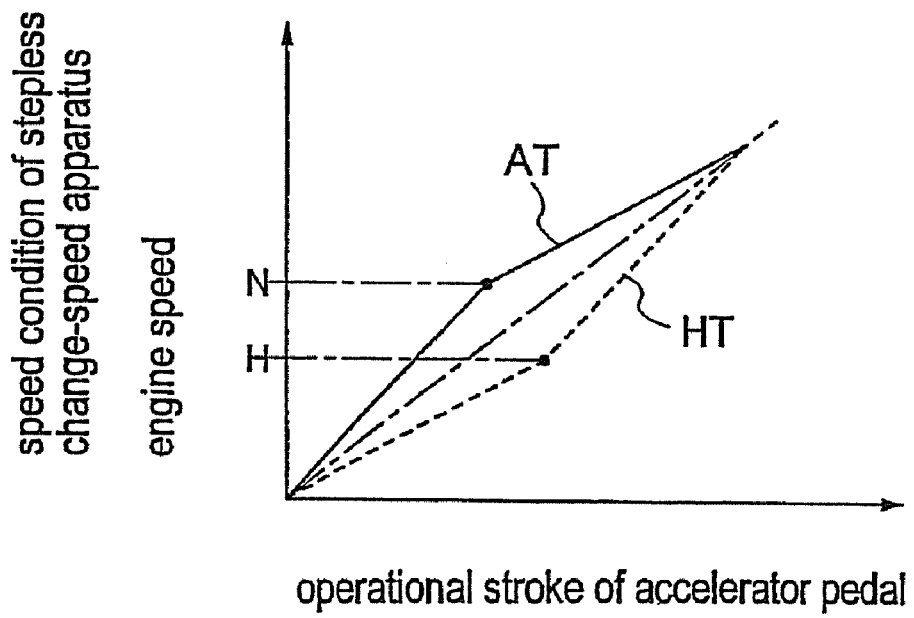
FIG. 12 is an explanatory view showing engine speed and change-speed characteristics of the stepless change-speed apparatus, relating to a further embodiment.

That is, the horizontal axes in FIGS. 11 and 12 represent the operational stroke of the accelerator pedal 55 and the vertical axes represent the engine speed (speed of the governor 50) and the speed condition of the stepless change-speed apparatus 30. And, a curve AT represents the engine speed governing characteristics of how the engine speed (speed of the governor 50) is varied in response to progressive operation of the accelerator pedal 55. A curve HT represents a change-speed characteristics of how the speed condition of the stepless change-speed apparatus 30 is varied in response to progressive operation of the accelerator pedal 55. Namely, as the accelerator pedal 55 is progressively stepped on from its stepped-on released position, the engine speed governor 50 and the stepless change-speed apparatus 30 are operated to the acceleration side in operative connection with each other, with a rate of the acceleration in the engine speed being greater than that in the acceleration of the stepless change-speed apparatus 30 until the engine speed rises to reach the predetermined speed N and the speed of the stepless change-speed apparatus 30 rises to reach the predetermined speed condition H. After the engine speed reaches the predetermined speed N and the stepless change-speed apparatus 30 reaches the predetermined speed condition H, the engine speed governor 50 and the stepless change-speed apparatus 30 will be operated to the acceleration side with such an operative correlation that the acceleration rate of the stepless change-speed apparatus 30 is greater than that of the engine speed.

As the predetermined speed N of the engine 3 and the predetermined speed condition H of the stepless change-speed apparatus 30, the maximum engine speed used during a start-up of the vehicle or its low-speed traveling on a rough terrain or a speed or speed condition slightly higher than the speed condition of the stepless change-speed apparatus 30 is set.

Upon release of the stepping-on of the accelerator pedal 55, the pivot link member 63 is pivotally returned to the stop position ST by the operational force of the return spring 71 of the automatic return mechanism 70 and this pivot link member 63 loosens the inner cable 64a of the control cable 64 so that the governor portion 51 of the engine speed governor 50 returned to the idling position by the resilient force of this speed governor 50, so that the engine speed is returned to the idling condition. In this, the pivot link member 63 pushes the link rod 67, thereby to return the change-speed controlling portion 40 of the stepless change-speed apparatus 30 to the disengaged position, so that the stepless change-speed apparatus 30 is returned to the neutral condition.

That is to say, if the accelerator pedal 55 is slightly stepped on to operate the engine speed governor 50 via the pedal side control cable 61 of the change-speed control linkage device 60, the pivot link member 63 and the governor side control cable 64, thereby to set the engine 3 to a speed slightly higher than the idling condition, in operative connection with this acceleration operation of the engine 3, the change-speed control linkage device 60 operates, via the link rod 67, the stepless change-speed apparatus 30 from the neutral condition to a power transmitting condition, whereby the driving force is transmitted to the front and rear wheels 1, 2 to cause the vehicle to start or to travel at a low speed. In the course of this, the change-speed control linkage device 60 operates the engine speed governor 50 and the stepless change-speed apparatus 30 with such operative correlation with each other that the engine speed may be increased at a higher rate than the acceleration of the stepless change-speed apparatus 30. With this, the engine 3 is accelerated at a rate higher than the acceleration in the stepless change-speed apparatus 30. As a result, even if a relatively large wheel driving load is applied, since the stepless change-speed apparatus 30 is at a relatively low speed condition, there hardly occurs engine power shortage. Hence, the start or low-speed traveling of the vehicle may take place smoothly.

When the accelerator pedal 55 is further stepped on, thereby to operate the engine speed governor 50 for farther acceleration to further increase the speed of the engine 3, thereby to set the engine 3 to a still higher speed, in operative connection with this further acceleration operation of the engine 3, the change-speed control linkage device 60 operates the stepless change-speed apparatus 30 for further acceleration, whereby the high speed driving force is transmitted to the front and rear wheels 1, 2 to cause the vehicle to travel at a high speed. In the course of this, the change-speed control linkage device 60 operates the engine speed governor 50 and the stepless change-speed apparatus 30 with such operative correlation with each other that the speed condition of the stepless change-speed apparatus 30 may be accelerated at a higher rate than the acceleration of the engine 3. As a result, even if a relatively large wheel driving load is applied, power shortage does not occur due to the high speed revolution of the engine 3. And, at, the same time, the significant change-speed operation of the stepless change-speed apparatus 30 may be effected speedily.

When the stepping-on operation on the accelerator pedal 55 is released, so that the engine speed governor 50 is operated by the functions of the change-speed control linkage device 60 and the automatic return mechanism 70, thereby to reduce the speed of the engine 3 to the idling condition, in operative connection with this deceleration of the engine 3, the link rod 67 of the change-speed control link device 60 returns the change-speed controlling portion 40 of the stepless change-speed apparatus 30 to the disengaged position by the operation force of the return spring 71 of the automatic return mechanism 70. With this, the stepless change-speed apparatus 30 is set to the neutral condition whereby the power transmission to the front and rear wheels 1, 2 is stopped and the traveling of the vehicle is stopped accordingly.

Figure 7:
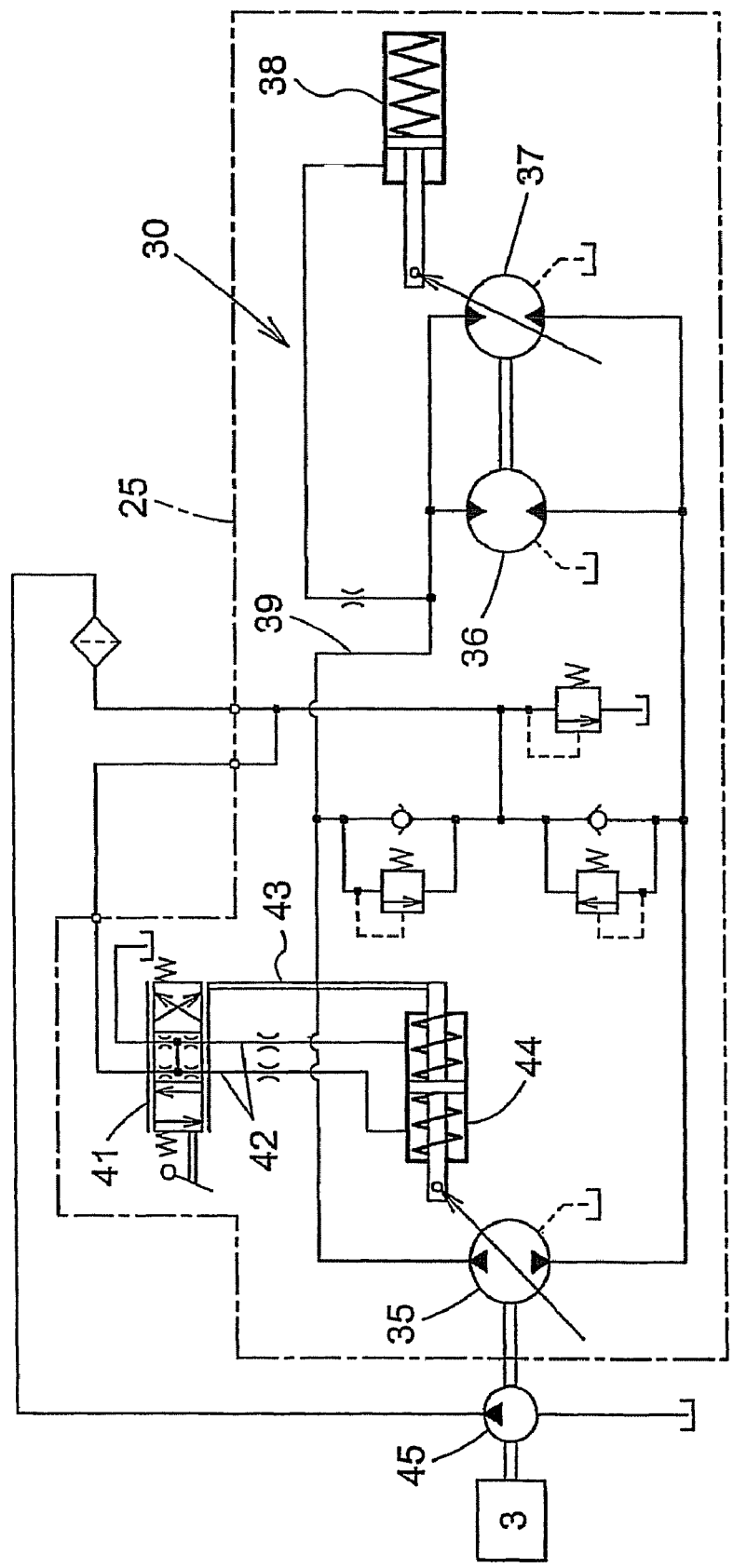
FIG. 7 is a hydraulic circuit diagram of the stepless change-speed apparatus.

As shown in FIG. 8, the change-speed controlling portion 40 of the stepless change-speed apparatus 30 is connected to and pivotable with an end of a rotational control shaft 41a of a servo valve 41 (FIG. 7) provided inside the transmission casing 25, which end projects outward from the transmission casing 25. As shown in FIG. 7, inside the transmission casing 25, there is provided a hydraulic servo cylinder 44 connected via a control oil passage 42 to the servo valve 41 and linked by a feedback mechanism 43. And, this cylinder 44 is operably coupled with a swash-plate control portion of the hydraulic pump 35. With these arrangements, the change-speed operation of the stepless change-speed apparatus 30 by the change-speed controlling portion 40 is made possible.

More particularly, when the change-speed controlling portion 40 is pivotally operated about the axis of the rotational control shaft 41a, this rotational control shaft 41a is rotated to switch over the servo valve 41 to the driving condition. Then, the servo valve 41 supplies the pressure oil from the hydraulic pump 45 via the oil passage 42 to the servo cylinder 44. With this, the servo cylinder 44 is driven to change the swash-plate angle of the hydraulic pump 35 and the driving speed of the hydraulic pump 35 is changed correspondingly to change the speed condition of the stepless change-speed apparatus 30. In this, the operation of the servo cylinder 44 is fed back to the servo valve 41 by the function of the feedback mechanism 43. So, when the stepless change-speed apparatus 30 reaches a control target speed condition corresponding to the operated position of the change-speed controlling portion 40, the servo valve 41 is switched over to the neutral condition, whereby the stepless change-speed apparatus 30 is maintained at this control target speed condition.

Other Embodiments

The foregoing embodiment employs the mechanical type change-speed control linkage device 60. Instead, an electric type control means may be employed, in which an engine speed governing actuator for operating the governor portion 51 of the engine speed governor 50 and the change-speed controlling portion 40 of the stepless change-speed controller 30 are automatically and respectively operated, based on detection information from a stroke sensor adapted for sensing an operated position of the accelerator pedal 55, whereby the engine speed governor 50 and the stepless change-speed apparatus 30 are operated in operative correlation with each other according to the operation of the accelerator pedal 55. Hence, the mechanical type change-speed control linkage device 60 and such electric control means are generically referred to herein as the "change-speed control linkage device 60".

When an electric control means is implemented, as shown in FIG. 11 and FIG. 12, it may be arranged such that the engine speed characteristics AT showing how the engine speed (speed condition of the engine speed governor 50) is varied in accordance with an operation of the accelerator pedal 55 and the change-speed characteristics HT showing how the speed condition of the stepless change-speed apparatus 30 is varied in accordance with the operation of the accelerator pedal 55 may be provided a curve comprising combination of a low-speed side straight line and a high-speed straight line.

In place of the governor side control cable 64, various link members such as a link rod, slidable by the pivot link member 63, may be employed. Further, in place of the link rod 67, various link members such as a control cable, slidable by the pivot link member 63, may be employed. Hence, such link members as the control cable 64 and the link rod are generically referred to herein as the "governor side link member 64". And, such members as the link rod 67 and the control cable are generically referred to herein as the "change-speed apparatus side link member 67".

The present invention may be applied to a construction which uses, in place of the hydrostatic stepless change-speed apparatus 30, other types of stepless change-speed apparatus using a split pulley and a belt or using a tapered cone. Therefore, these types of change-speed apparatuses of the hydrostatic, belt or tapered-cone types are generically referred to herein as the "stepless change-speed apparatus 30".

In place of the accelerator pedal 55, an accelerator lever may be use. Or, the accelerator pedal 55 and the accelerator lever may used in combination also. Hence, these members such as the accelerator pedal 55 and the accelerator lever, are generically referred to as the "accelerator controller 55".

The present invention may be applied to a crawler type utility vehicle, in addition to the above-described type of vehicle using the front and rear wheels 1, 2 for traveling. Hence, all these components including the front and rear wheels 1, 2 and the crawler traveling unit are referred to herein as the "traveling units 1, 2".

The invention may be embodied in any other way than disclosed in the above detailed description without departing from the essential spirit thereof defined in the appended claims. All modifications apparent for those skilled in the art are intended to be encompassed within the scope of the invention defined by the claims.

The invention claimed is:

1. A work vehicle comprising:
a pair of steerable front wheels and a pair of rear wheels;
a frame supported by the front and rear wheels;
an engine supported by the frame and generating power to drive at least the rear wheels, a forward end of the engine being located in a middle region between a first line that passes through each shaft of the pair of front wheels and a second line that passes through each shaft of the pair of rear wheels, when the front and rear wheels are oriented straight forward, or closer to the second line than to the first line, wherein a crank shaft of the engine extends in a longitudinal direction of the work vehicle;
a gear transmission that defines a part of a drive train for transmitting power from the engine to at least the rear wheels;
a transmission case that houses at least the gear transmission, the transmission case being connected to the engine such that the engine and the case foams an integral unit;
a hydrostatic change speed apparatus that transmits power from the engine to the gear transmission; and
a first housing for the hydrostatic change speed apparatus that houses at least a part of the hydrostatic change speed apparatus,
wherein the hydrostatic change speed apparatus has a hydraulic pump, a fixed displacement hydraulic motor and a variable displacement hydraulic motor, wherein the first housing houses the hydraulic pump and the fixed displacement hydraulic motor.

2. A work vehicle according to claim 1 further comprising:
a rear wheel differential mechanism housed in the transmission case.

3. A work vehicle according to claim 1, wherein the engine has a flywheel housed in a flywheel case which forms an integral part of the transmission case, the transmission case being connected to the engine through the flywheel case.

4. A work vehicle according to claim 1, wherein the first housing is formed integrally with the transmission case.

5. A work vehicle according to claim 1 further comprising:
a second housing located rearwardly of the first housing, the second housing accommodating the variable displacement hydraulic motor.

6. A work vehicle according to claim 5 further comprising:
a port block located between the first housing and the second housing.

7. A work vehicle according to claim 6, wherein the port block is substantially plate-shaped.

8. A work vehicle according to claim 1, wherein each of the pair of rear wheels is resiliently supported by a leaf spring attached to the frame.

9. A work vehicle according to claim 1 further comprising:
a load carrying bed supported by the frame and located in a rear region of the work vehicle, at least a major portion of the engine is located below the load carrying bed such that the major portion of the engine overlaps with the load carrying bed in plan view.

10. A work vehicle according to claim 1 further comprising:
a radiator located forwardly of the engine for cooling the engine, a radiator fan shaft of the radiator being oriented laterally with respect to the longitudinal direction of the work vehicle.

11. A work vehicle according to claim 10 further comprising:
a lateral side plate supported by the frame and forming a ventilation area for taking in air into the radiator at a location of the side plate corresponding to the position of the radiator.

12. A work vehicle comprising:
a pair of steerable front wheels and a pair of rear wheels;
a frame supported by the front and rear wheels;
an engine supported by the frame and generating power to drive at least the rear wheels;
a gear transmission that defines a part of a drive train for transmitting power from the engine to at least the rear wheels;
a rear wheel differential mechanism located in the drive train, between the gear transmission and the rear wheels;
a first output shaft extending from one side of the rear wheel differential mechanism;
a second output shaft extending from a side opposite from the one side of the rear wheel differential mechanism;
a first rotational shaft connected to one of the pair of rear wheels;
a second rotational shaft connected to another of the pair of rear wheels;
a first joint located between and articulately joining the first output shaft and the first rotational shaft;
a second joint located between and articulately joining the second output shaft and the second rotational shaft; and
a hydrostatic change speed apparatus that transmits power from the engine to the gear transmission, the hydrostatic change speed apparatus being located rearwardly of the first and second output shafts.

13. A work vehicle according to claim 12, wherein a forward end of the engine being located in a middle region between a first line that passes through each shaft of the pair of front wheels and a second line that passes through each shaft of the pair of rear wheels, when the front and rear wheels are oriented straight forward, or closer to the second line than to the first line.

14. A work vehicle according to claim 12, wherein each of the joints is a universal joint.

15. A work vehicle according to claim 12, wherein the hydrostatic change speed apparatus has a hydraulic pump, a fixed displacement hydraulic motor and a variable displacement hydraulic motor.

16. A work vehicle according to claim 15, wherein the fixed displacement hydraulic motor and the variable displacement hydraulic motor are located in series and have a common output shaft.

17. A work vehicle according to claim 12, wherein each of the pair of rear wheels is resiliently supported by a leaf spring attached to the frame.

18. A work vehicle according to claim 12 further comprising:
a load carrying bed supported by the frame and located in a rear region of the work vehicle, at least a major portion of the engine is located below the load carrying bed such that the major portion of the engine overlaps with the load carrying bed in plan view.

19. A work vehicle comprising:
a first and second steerable front wheels;
a first and second rear wheels;
a frame supported by the front and rear wheels;
an engine supported by the frame and generating power to drive at least the rear wheels;
a gear transmission that defines a part of a drive train for transmitting power from the engine to at least the rear wheels;
a rear wheel differential mechanism located in the drive train, between the gear transmission and the rear wheels;
a transmission case that houses the gear transmission and the rear wheel differential mechanism;
a first output shaft extending from a side of the differential mechanism facing the first rear wheel;
a second output shaft extending from a side of the differential mechanism facing the second rear wheel;
a first multi-plate brake for braking a rotational movement of the first rear wheel, the first multi-plate brake connected with the first output shaft and provided to the transmission case;
a second multi-plate brake for braking a rotational movement of the second rear wheel, the second multi-plate brake connected with the second output shaft and provided to the transmission case;
a third multi-plate brake for braking a rotational movement of the first front wheel;
a forth multi-plate brake for braking a rotational movement of the second front wheel; and
a hydrostatic change speed apparatus that transmits power from the engine to the gear transmission, the hydrostatic change speed apparatus being located rearwardly of the first and second output shafts.

20. A work vehicle according to claim 19, further comprising:
a front wheel drive rotational shaft extending forwardly from the gear transmission for transmitting power from the engine to the first and second front wheels, a front wheel differential mechanism that is connected to the front wheel drive rotational shaft, a third rotational shaft that transmits power from the front wheel differential mechanism to the first front wheel and a fourth rotational shaft that transmits power from the front wheel differential mechanism to the second front wheel.

21. A work vehicle according to claim 19, wherein at least a part of the third multi-plate brake overlaps with a tire of the first front wheel, at least a part of the fourth multi-plate brake overlaps with a tire of the second front wheel.

22. A work vehicle according to claim 19, wherein an entirety of the third multi-plate brake overlaps with a tire of the first front wheel, an entirety of the fourth multi-plate brake overlaps with a tire of the second front wheel.

23. A work vehicle according to claim 19, wherein each of the first and second multi-plate brakes is located in a position such that each of the first and second multi-plate brakes overlaps with the transmission case in plan view.

24. A work vehicle according to claim 19 further comprising:
a first rotational shaft connected to the first rear wheel;
a second rotational shaft connected to the second rear wheel;
a first joint located between and articulately joining the first output shaft and the first rotational shaft;
a second joint located between and articulately joining the second output shaft and the second rotational shaft.

25. A work vehicle according to claim 19, wherein the transmission case is connected to the engine such that the engine and the transmission case form an integral unit.

26. A work vehicle according to claim 25, wherein the engine has a flywheel housed in a flywheel case which forms an integral part of the transmission case, the transmission case is connected to the engine through the flywheel case.

27. A work vehicle comprising:
a pair of steerable front wheels and a pair of rear wheels;
a frame supported by the front and rear wheels;
an engine supported by the frame and generating power to drive at least the rear wheels;
a gear transmission that defines a part of a drive train for transmitting power from the engine to at least the rear wheels;
a rear wheel differential mechanism located in the drive train, between the gear transmission and the rear wheels;
a first output shaft extending from one side of the rear wheel differential mechanism;
a second output shaft extending from a side opposite from the one side of the rear wheel differential mechanism;
a hydrostatic change speed apparatus that transmits power from the engine to the gear transmission, the hydrostatic change speed apparatus being located rearwardly of the first and second output shafts,
wherein the hydrostatic change speed apparatus has a hydraulic pump, a fixed displacement hydraulic motor and a variable displacement hydraulic motor.

28. A work vehicle according to claim 27, wherein an input shaft, that inputs power from the engine to the hydrostatic change speed apparatus, extend forwardly from the hydrostatic change speed apparatus.

29. A work vehicle according to claim 28, wherein an output shaft, that transmits power from the hydrostatic change speed apparatus to the gear transmission, extend forwardly from the hydrostatic change speed apparatus to the gear transmission, wherein the input shaft and the output shaft of the hydrostatic change speed apparatus are substantially parallel to each other.

30. A work vehicle according to claim 28, wherein the input shaft of the hydrostatic change speed apparatus also functions as a PTO shaft.

31. A work vehicle according to claim 27, wherein the fixed displacement hydraulic motor and the variable displacement hydraulic motor are located in series and have a common output shaft.

* * * * *

UNITED STATES PATENT AND TRADEMARK OFFICE
CERTIFICATE OF CORRECTION

| | | |
|---|---|---|
| PATENT NO. | : 7,926,387 B2 | |
| APPLICATION NO. | : 12/047024 | |
| DATED | : April 19, 2011 | |
| INVENTOR(S) | : Yoshifumi Horiuchi | |

It is certified that error appears in the above-identified patent and that said Letters Patent is hereby corrected as shown below:

Column 11, Line 57, Claim 1, "foams" should read -- forms --

Signed and Sealed this
Sixth Day of September, 2011

David J. Kappos
*Director of the United States Patent and Trademark Office*